US012747736B2

United States Patent
Garcia Delgado et al.

(10) Patent No.: US 12,747,736 B2
(45) Date of Patent: Sep. 29, 2026

(54) 4D PRINTED FAN WITH OPTIMIZED COOLING

(71) Applicant: INTERNATIONAL BUSINESS MACHINES CORPORATION, Armonk, NY (US)

(72) Inventors: Carolina Garcia Delgado, Zapopan (MX); Daniel Angeles Garcia, Guadalajara (MX); Jonathan Cottrell, Canandaigua, NY (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/987,510

(22) Filed: Dec. 19, 2024

(65) Prior Publication Data

US 2026/0177073 A1 Jun. 25, 2026

(51) Int. Cl.

| | |
|---|---|
| ***F04D 29/38*** | (2006.01) |
| ***F03G 7/06*** | (2006.01) |
| ***F04D 27/00*** | (2006.01) |

(52) U.S. Cl.

CPC ......... *F04D 29/384* (2013.01); *F03G 7/0614* (2021.08); *F04D 27/004* (2013.01)

(58) Field of Classification Search

None

See application file for complete search history.

(56) References Cited

U.S. PATENT DOCUMENTS

| | | | | |
|---|---|---|---|---|
| 6,669,447 | B2 | 12/2003 | Norris et al. | |
| 10,287,006 | B1 * | 5/2019 | Beckman | B64C 27/39 |
| 12,022,634 | B2 | 6/2024 | Yan et al. | |
| 2002/0131859 | A1 * | 9/2002 | Alacqua | F04D 29/368 415/12 |
| 2018/0135635 | A1 * | 5/2018 | Staroselsky | B22F 3/1115 |

FOREIGN PATENT DOCUMENTS

| | | | |
|---|---|---|---|
| CN | 110005640 | A | 7/2019 |
| CN | 211349227 | U | 8/2020 |
| CN | 111894909 | A | 11/2020 |
| CN | 111698892 | B | 8/2021 |
| CN | 114813162 | A | 7/2022 |
| IN | 202111039495 | A | 9/2021 |
| JP | H03-179197 | A | 8/1991 |
| JP | H0932799 | A | 2/1997 |
| JP | 2014181633 | A * | 9/2014 |

(Continued)

OTHER PUBLICATIONS

Liu et al (Carbon fiber reinforced shape memory epoxy composites with superior mechanical performances; Available online Apr. 15, 2019) (Year: 2019).*

(Continued)

*Primary Examiner* — Juan G Flores

(74) *Attorney, Agent, or Firm* — CHIP LAW GROUP

(57) ABSTRACT

A method includes receiving sensor data indicating environmental conditions and determining an optimal fan blade shape based on the sensor data. A shape of a fan blade of a cooling fan is adjusted, wherein the fan blade includes a shape-changing material that changes shape in response to the environmental conditions.

5 Claims, 7 Drawing Sheets

(56) References Cited

FOREIGN PATENT DOCUMENTS

| | | | |
|---|---|---|---|
| KR | 10-2042654 | B1 | 11/2019 |
| WO | 2022/068349 | A1 | 7/2022 |

OTHER PUBLICATIONS

"Server fans: what they are, how they work", HWP24, retrieved from web dated Feb. 13, 2025, 8 pages.
"Shifting Transport Paradigms", IBM Institute for Business Value, retrieved from web dated Feb. 13, 2025, 16 pages.
"What is 4D print—20incredible examples", 3D idea, retrieved from web dated Feb. 13, 2025, 18 pages.
Ji et al. "Optimal shape morphing control of 4D printed shape memory polymer based on reinforcement learning", Robotics and Computer-Integrated Manufacturing, 2022, 11pages.
Nate Holmer. "The Harmful Sounds of Data Centers", Noise-Induced Hearing Loss, Sep. 7, 2022, 8 pages.
Wang et al. "Programmable spatial deformation by controllable off-center freestanding 4D printing of continuous fiber reinforced liquid crystal elastomer composites", Nature communications, Jun. 30, 2023.
Zoubolis et al. "Employment of 3D-Printed Bilayer Structures with Embedded Continuous Fibers forThermal Management Applications: An Axial Cooling 4D-Printed Fan Application CaseStudy", Polymers (Basel), Oct. 2022, 16 pages, vol. 14, Issue No. 19.
International Searching Authority, "Notification of Transmittal of the International Search Report and the Written Opinion of the International Searching Authority, or Declaration," Patent Cooperation Treaty, Apr. 16, 2026, pages, International Application No. -PCT/IB2025/062083.

* cited by examiner

4D PRINTED FAN WITH OPTIMIZED COOLING

BACKGROUND

The present invention generally relates to cooling fans and, more particularly, to cooling fans that are 4D printed and responsive to environmental conditions to optimize cooling performance.

A main function of server fans is to maintain a temperature range of a server system within pre-defined limits. Since servers operate continuously, a large amount of heat is generated. If not controlled, heat build-up can lead to undesirable conditions, such as computer processing unit (CPU) overheating, improper operation of random access memory (RAM), etc. These conditions can cause server system malfunctions and result in significant losses of important data and equipment.

Current heatsink designs used to maintain heat transfer in, e.g., servers, laptops, desktops, graphic cards, microprocessors, etc., all have a same base line: heat increases result in increased voltage of a fan system to increase speed (rotations per minute (RPMs)). This increases power consumption and fan noise.

SUMMARY

In accordance with an embodiment of the present invention, a method includes receiving sensor data indicating environmental conditions and determining an optimal fan blade shape based on the sensor data. A shape of a fan blade of a cooling fan is adjusted, wherein the fan blade includes a shape-changing material that changes shape in response to the environmental conditions.

In accordance with another embodiment of the present invention, a system includes a fan comprising a plurality of fan blades, wherein at least one fan blade of the plurality of fan blades includes a shape-changing material and a sensor configured to detect environmental conditions. A processor set, one or more computer-readable storage media and program instructions stored on the one or more computer-readable storage media cause the processor set to perform operations that include determining correlations between the environmental conditions and optimal fan blade shapes using a machine learning model and adjusting a shape of the at least one fan blade.

In accordance with another embodiment of the present invention, a cooling fan includes a hub and a plurality of fan blades attached to the hub. At least one fan blade of the plurality of fan blades includes a shape-changing material that changes a shape of the at least one fan blade in response to environmental conditions.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures, wherein.

DETAILED DESCRIPTION

Figure 1:
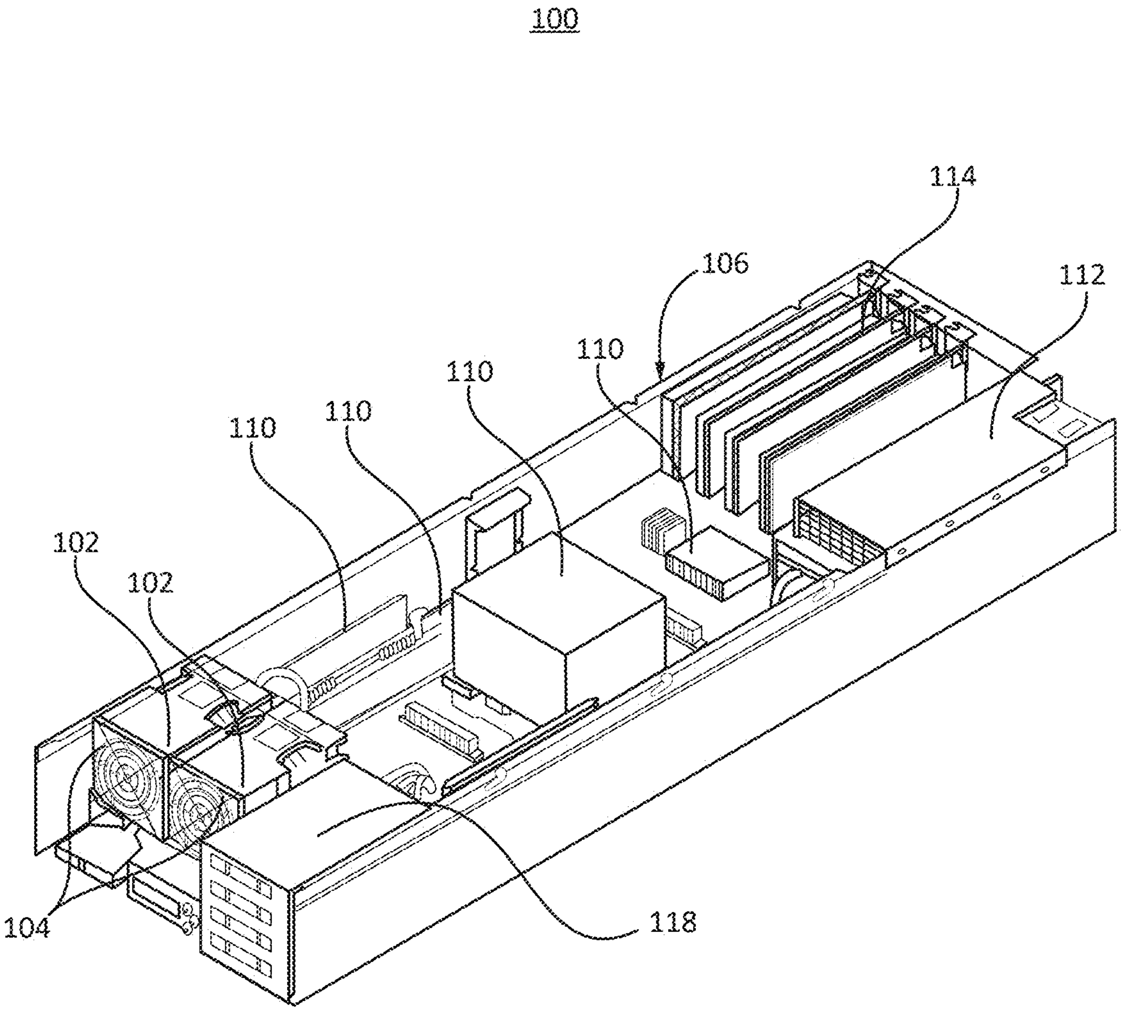
FIG. 1 is a perspective view of an electronic cabinet having self-adjusting fans that adjust in response to environmental conditions, in accordance with embodiments of the present invention.

In accordance with embodiments of the present invention, systems and methods are described which utilize three-dimensional (3D) and four dimensional (4D) printing of a fan design to optimize cooling system performance. In particularly useful embodiments, the fans can be employed in electronic cabinets and can be employed to cool servers, computers or other devices where a heat sink is needed. In an embodiment, a 3D/4D printed fan blade includes shape-shifting properties. A tunable controller can be employed to adjust a shape of the fan blade in response to changes in an operating environment including, e.g., temperature, noise, and humidity. A knowledge base of data can be created to include correlations between the temperature, the noise, and the humidity and associated changes that a shape of the fan blade should undergo to optimize performance. The data can be input into a machine learning model so that the machine learning model can be employed to train the fan blade to adjust to an optimal shape. The systems and methods can adjust a length, a width, a curvature, etc. of the fan blade. Other parameters can include adjustment to the fan speed along with the dimensional adjustments. The systems and methods can include 3D/4D printing from a liquid crystal elastomer material to provide the shape-shifting properties. Other materials can also be employed.

The present embodiments reduce the level of power consumption (e.g., reduce carbon footprint) but also reduce noise contamination, which are concerns in Data Center environments. 4D-printed fans can also include healing capabilities which can be employed to restore the shape or repair minor damage based on its present conditions.

Types of self-healing materials that can be employed in accordance with embodiments of the present invention can include, e.g., thermoplastic polymers, polyurethane and epoxy composites, microencapsulated self-healing materials, conductive self-healing materials, etc. These materials can employ one or more processes by which self-healing occurs. For example, self-healing can occur by chemical reactions, physical reconfiguration, capillary action, microcapsule rupture, phase change mechanisms, etc.

Referring now to the drawings in which like-numerals represent the same or similar elements and initially to FIG.

1, a system 100 having an electronic cabinet 106 with self-adjusting fans 102 is shown and described in accordance with embodiments of the present invention. The self-adjusting fans 102 include fan blades 104 formed from materials with shape-shifting properties. The self-adjusting fans 102 provide heat transfer from the electronic cabinet 106. The electronic cabinet 106 can include any number or type of device that generate heat during operations. The electronic cabinet 106 can include, e.g., electronic components 110 including chips, DIMMs, circuit boards including graphic cards, 114, a power supply 112, solid-state memory devices 118, etc.

During operations, with increased temperature (or other conditions), the fan blades 104 adjust by expanding or contacting in accordance with the conditions. In some embodiments, the fan blades 104 can undergo other changes, e.g., a curvature of the fan blades can increase or decrease in accordance with the conditions. In another embodiment, the fan blades 104 can include a self-healing material to prevent cracks from developing or to repair minor surface damage.

While heat dissipation is an important consideration in fan design, high noise level is another important concern. Data Centers have a high concentration of fans which are continuously running since computer processing units (CPUs) and graphics processing units (GPU) are often working at maximum capacity. This means that fans are also operating at their highest design levels. An average Data Center has a noise level between 92-96 dB. This can be compared to 60 dB for a normal conversation, and 80 dB for a scream.

In an example, a fan specification for a 1U server with 1 processor can have an operation voltage of, e.g., 11.8 to 13.3 VDC with input current of 2.40 to 4 Amp and input power of 28.8 to 52.2 W. Fan speeds can include front: 16000+−15% RPM; rear: 12000+−12% RPM with acoustic noise between 54 to 68 dB-A.

Figure 2:
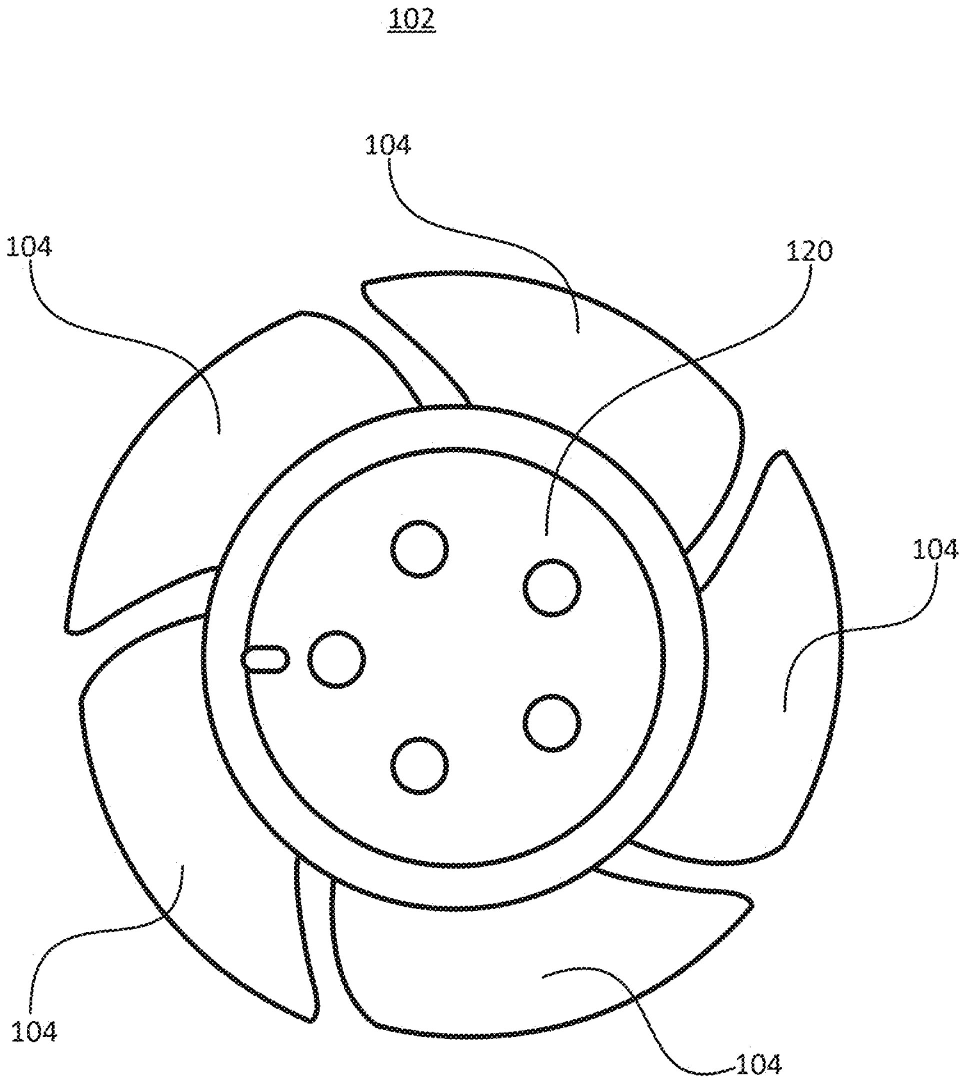
FIG. 2 is a front view of a fan fabricated using a 4D printing process in accordance with embodiments of the present invention.

Referring to FIG. 2, a fan 102 fabricated using a 4D printing process is shown in accordance with an embodiment. The fan 102 includes two or more fan blades 104 disposed about and attached to a central hub 120. The fan blades 104 are printed from a material that can react to environmental conditions. In an example, as temperature increases the fan blades 104 change shape to provide less power consumption, less noise and/or more airflow.

Typical fan blades have a same rigid design shape. To increase the speed of these fans, the fan receives a voltage increase which will force more fresh air from outside the system to inside of the system. Embodiments of the present invention use smart materials (e.g., shape-shifting) to react to a catalyst, e.g., heat, and using a geometric coding in the matrix of the fan blades 104, the fan blades 104 can elongate or contract to increase the cool air flow inside the system without the need to increase the voltage or increase the fan speed.

In an embodiment, a material that can be employed to 4D print the fan blades 104 can include liquid crystalline elastomer (LCE). LCE permits the fan blades 104 to operate from between, e.g., −10 degrees C. to 40 degrees C. When the temperature reaches 40 degrees C., the blades 104 can change form to an elongated shape that increases the air flow of the fan 102, while maintaining a range of voltage and RPMs resulting in the same level of noise and an increase of air flow.

4D printing uses 3D printers to create three dimensional objects using intelligent materials, which can be programmed to change shape or size when they receive an external stimulus, such as heat or humidity. 4D printing includes materials in a 3D printing process that enable a new shape or functionality by reacting with the environment. In an example, shape-memory polymers (SMPs) can be employed which recover their original shape after deformation under environmental conditions, such as, temperature changes. Depending on the polymer or combinations of polymers, a number of configurations or shapes can be achieved. Digital SMPs utilize 3D-printing technology to provide placement, geometry, mixing and curing ratios of SMPs with differing properties, such as glass transition or crystal-melt transition temperatures. 4D ink/filaments can be applied to other substates or materials to achieve a combined effect that can include added strength or provide a particular motion when the shape change is invoked.

The 4D printing process can include arranging materials to enable a beneficial shape change. This can include applying shape changing materials at a periphery of the fan blade 104 or applying materials in lines or other shapes across the fan blades 104 to achieve a twist or expansion in accordance with a planned deflection.

Figure 3:
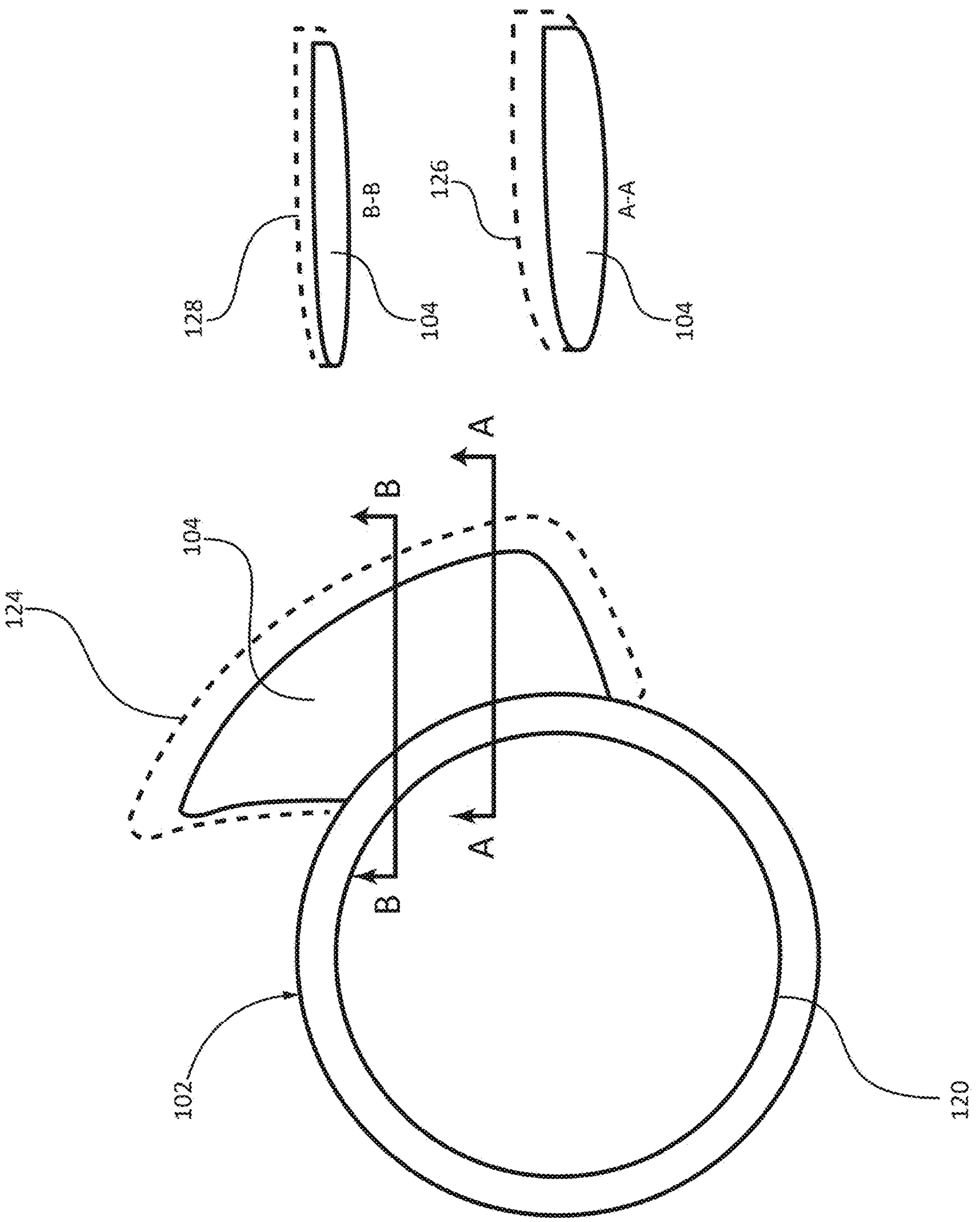
FIG. 3 is a front view of a fan illustratively showing a single blade on a hub with other blades omitted to illustrate blade expansion, in accordance with embodiments of the present invention.

Referring to FIG. 3, a fan 102 is shown having a single blade 104 on a hub 120 with other blades omitted to illustrate blade expansion in accordance with an embodiment. The fan blades 104 can be configured to change dimensions or shape by either elongating their shape, curvature, length and/or width to allow for more air flow. This permits continued operations within design parameters. When the fan blades 104 elongate to a new position 124, this may result in a slight voltage increase but with a corresponding decrease in RPMs. As the fans 102 are employed over time, there is a need to continually respond to ever changing factors outside and inside the system the fan 102 serves. Along with temperature, adjustments can be made with humidity. For example, there is a need to adjust to an age of system components which may become more sensitive to extreme relative humidity fluctuations with time. These factors can also affect the noise level over time. In such cases, the fan 102 may need to elongate and/or contract to reduce power and noise levels.

In an embodiment, a shape of the fan blade 104 can change. The change in shape need not be uniform across the fan blade 104. For example, a change 126 in thickness and/or curvature at cross section A-A is different from a change 128 in thickness and/or curvature at and cross-section B-B. The shape change designed into the fan blades 104 is based on materials that the fan blades 104 are composed of. These materials, their quantity and structure are carefully controlled during the 4D printing process. In an embodiment, artificial intelligence can be employed to guide the material composition of the fan blades 104 during fabrication.

The 4D printing process for creating shape-changing fan blades includes selecting shape-changing materials, such as liquid crystal elastomers (LCEs), shape-memory polymers (SMPs), etc. or combinations thereof. These materials may be chosen based on their ability to respond to specific environmental stimuli, such as temperature or humidity changes. The 4D printing process may utilize specialized 3D printers capable of working with the selected shape-changing materials. In some cases, these printers may need to be modified or customized to handle the unique properties of the materials. The printing process may involve carefully controlled deposition of the shape-changing materials in specific patterns or configurations to achieve the desired shape-changing behavior.

During the design phase, computational modeling and simulation tools may be employed to predict and optimize the shape-changing behavior of the fan blades 104. This may involve creating digital models that incorporate the material properties, environmental stimuli, and desired shape transformations. The models may help determine the optimal distribution and arrangement of shape-changing materials within the fan blade structure. Artificial intelligence systems can be employed to assist in fan blade optimization in its different states.

The printing process may involve multiple stages or layers to create the complex structure of the fan blades 104. In some implementations, the shape-changing materials can be combined with other structural materials to provide additional strength or stability. The process may also include the incorporation of conductive traces or other elements to enable controlled shape changes through electrical stimulation.

Post-printing treatments may be necessary to activate or finalize the shape-changing properties of the materials. This may include thermal treatments, chemical processes, or exposure to specific environmental conditions to set the initial shape and program the desired shape-changing behavior. Self-healing materials can be employed within the matrix or over the surface of the fan blades 104 as well.

In some embodiments, the 4D printing process can include the integration of sensors or other smart components directly into the fan blade structure. These elements may help monitor environmental conditions and trigger shape changes as needed.

Figure 4:
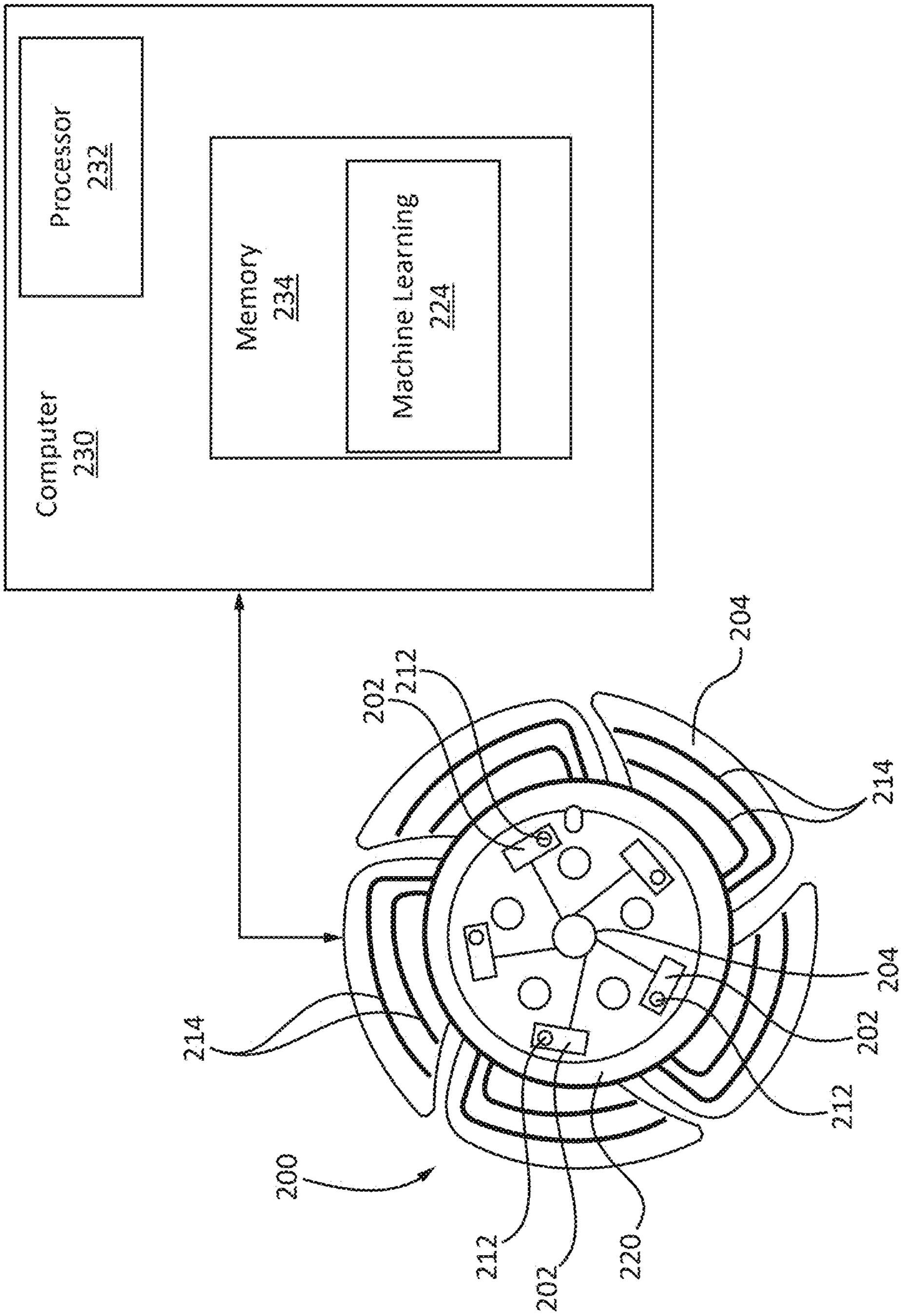
FIG. 4 is a front view of a fan having active elements to control shape-changing in accordance with environmental conditions and schematically showing a computer control system, in accordance with embodiments of the present invention.

Referring to FIG. 4, in another embodiment, rather than the fan blade 104 being wholly responsive to environmental conditions, a fan 200 includes a plurality of controllable fan blades 204, which can be controlled using one or more controllers 202. The controllers 202 can be employed to provide current through the fan blades 204 to provide resistive heating or cooling to alter a shape or size of the fan blades 204 responsive to sensor feedback. The controllers 202 can include electro-thermal controllers. The controllers 202 can be located on the hub adjacent to the fan blades 204 and provide weight-balancing by employing symmetry. In other embodiments, the controllers 202 can be located within a housing (not shown) of the fan 200. The controllers 202 can include sensors 212 to measure parameters such as temperature, vibration, humidity, etc. The hub 220 need not include the sensors 212 as the sensors can be located in the fan housing or other locations.

The controllers 202 can also be formed in or mounted within the fan blades 204. The fan blades 204 can include conductive/resistive traces or elements 214 that can be disposed within polymeric materials of the fan blades 204 during 3D/4D printing of the fan blades 204. The traces or elements 214 can connect to the controllers 202 through or over the hub 220. The controllers 202 can connect to a transformer that is powered by a power supply that also powers the fan 200 through connections 210. The controllers 202 can include other power sources instead of the main power supply including batteries, etc.

The 4D printing process may incorporate resistive elements into the fan blades 204 during fabrication. In some aspects, conductive materials or inks may be deposited along with the shape-changing materials to create integrated resistive heating elements or conductive/resistive traces or elements 214 within the fan blade structure. These elements 214 may be arranged in specific patterns or configurations to allow for targeted heating and shape control.

The elements 214 can be connected to electro-thermal controllers, which can regulate the current flowing through the conductive traces. By adjusting the current, the controllers may induce localized heating (or cooling) in specific areas of the fan blades. This can trigger shape changes in the responsive materials, allowing for precise manipulation of the fan blade geometry.

In some implementations, the controllers 202 may use sensor feedback to dynamically adjust the shape of the fan blades. The controllers 202 may receive input from temperature sensors, vibration sensors, or other environmental monitoring devices. Based on this data, the controllers may activate different elements or adjust the heating patterns to achieve the desired blade shape for optimal performance under the current conditions.

The 4D printing process may allow for the creation of complex resistive element networks within the fan blades. In some cases, multiple layers of conductive traces may be incorporated, enabling more sophisticated shape control. The process may also involve the use of materials with varying electrical properties to create zones with different heating characteristics within the blade structure.

Electro-thermal control may offer advantages over purely passive shape-changing mechanisms. The active control may allow for faster response times and more precise shape adjustments. The fan blades 204 can compensate for variations in environmental conditions or changes in fan performance over time by fine-tuning the shapes through active control.

The integration of resistive elements and electro-thermal control may be carefully designed during the 4D printing process to ensure proper functionality and durability. Considerations may include the thermal properties of the materials, the electrical resistance of the conductive traces, and the heat distribution patterns within the fan blade structure. Simulation and modeling tools may be employed to optimize the design and placement of the resistive elements for effective shape control.

The controllers 202 (and/or the sensors 212) can recognize changes in the operating environment. In accordance with the sensed environmental changes, the traces or elements 214 can provide resistive heating (or cooling) depending on the material employed in the traces or elements 214 as controlled by the controllers 202. The controllers 202 can be programmed to respond autonomously to certain thresholds or levels of temperature, noise (vibration), humidity, and other conditions, and adjust a shape, size or curvature of the fan blades 204 accordingly to reduce power and noise levels. In this way, the fan blades 204 can elongate or contract as needed to optimize the cooling system performance. By employing condition controlled shape-shifting liquid crystal elastomer (LCE) materials, the fan blade changes are enabled to make shape changes quickly and accurately.

In an embodiment, the controllers 202 can be managed and optimized according to the particular situations, in the operating environment, using a machine-learning model 224. The machine leaning model 224 can be part of a computer system 230. The computer system 230 can include one or more processors 232 and memory 234 for storing the machine learning model 224.

The machine leaning model 224 can be employed to receive sensor data and/or controller feedback to evaluate conditions and supply current or voltage responses to optimize the fan blades 204 accordingly. The data received from the controllers 202 and/or sensors 212 can be employed to further train the machine learning model 224 so that changes can be tracked and adjusted for over time. The data can include, e.g., temperature, noise, humidity, fan speed, power consumption, etc.

The machine-learning model 224 creates a knowledge base of data which helps to analyze correlations between parameters like, e.g., temperature, noise, humidity, etc. and the changes in shape the fan blades 204 should undergo to the maximize cooling performance. The inputs to the machine learning model 224 can include sensor inputs, etc. and the output will be signal sets to the controllers 202 for changing and maintaining the fan blades 204. By inputting data into the machine learning model 224, the fan blades 204 can quickly and accurately respond to changes in the operating environment and adjust shape accordingly. This ensures that the cooling system is performing at its peak efficiency.

The machine learning model 224 can consider the effects of elongation or other changes to the fan blades 204 which may slightly affect power consumption and output noise levels. These tradeoffs between lower noise levels and power consumption in these environments can be addressed in accordance with guidance from the machine learning model 224, which can provide appropriate signaling for the controllers 202. The machine learning model 224 can consider the effects and provide adjustments to, e.g., fan blade shape, power consumption, noise levels, fan speed, overall cooling system performance, etc.

3D/4D printed fan can adjust its shape as needed over time to reduce power and noise levels. With a fan designed in this manner, a quick response to fast changing internal and external conditions are possible to minimize power and noise levels while allowing the system to operate as expected.

Machine learning model 224 can be used to create a knowledge base (knowledge corpus) across a Data Center or greater area for analyzing correlations between parameters and shape changes. Iterative cycles are implemented for positive and negative tracking of real-world conditions, leading to feedback for reprogramming of fan blades.

Machine learning model 224 can include neural networks to improve functioning and accuracy through exposure to empirical data. A neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the input data belongs to each of the classes can be output.

The empirical data, also known as training data, from a set of examples, can be formatted as a string of values and fed into the input of the neural network. Each example may be associated with a known result or output. Examples can include solid-state batteries having particular failure modes being associated with countermeasures, shock and vibration response features associated with countermeasures, etc. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network can include nodes and has an input layer of source nodes, and a single computation layer having one or more computation nodes that also act as output nodes, where there is a single computation node for each possible category into which the input example could be classified. An input layer can have a number of source nodes equal to the number of data values in the input data. The data values in the input data can be represented as a column vector. Each computation node in the computation layer generates a linear combination of weighted values from the input data fed into nodes of the input layer, and applies a non-linear activation function that is differentiable to the sum. The exemplary simple neural network can perform classification on linearly separable examples (e.g., patterns).

A deep neural network, such as a multilayer perceptron, can have a plurality of nodes and include an input layer of source nodes, one or more computation layer(s) having one or more computation nodes, and an output layer, where there is a single output node for each possible category into which the input example could be classified. An input layer can have a number of source nodes equal to the number of data values in the input data. The computation nodes in the computation layer(s) can also be referred to as hidden layers, because they are between the source nodes and output node(s) and are not directly observed. Each node in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the input data. A deep neural network can be fully connected, where each node in a computational layer is connected to all other nodes in the previous layer, or may have other configurations of connections between layers. If links between nodes are missing, the network is referred to as partially connected.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
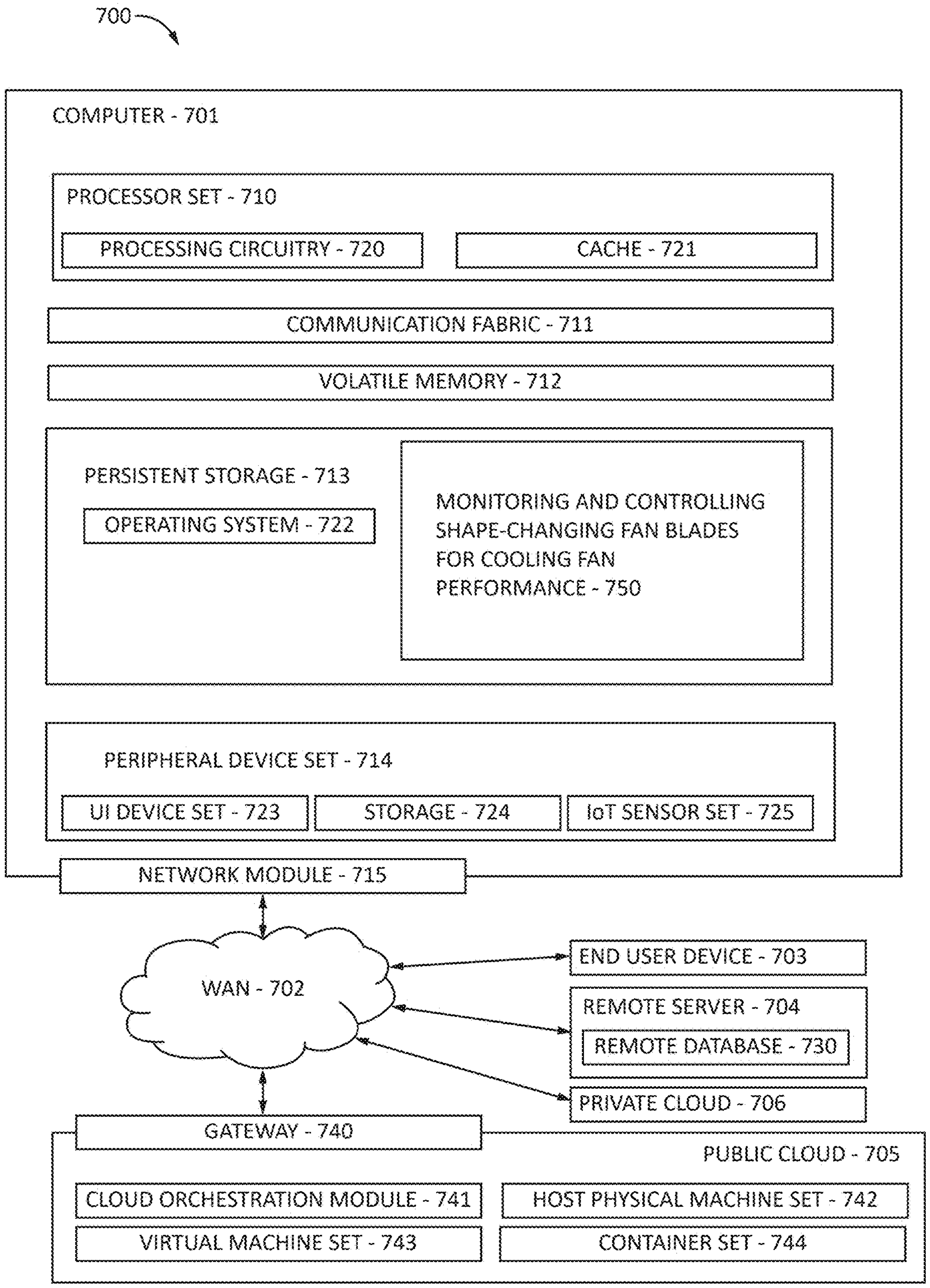
FIG. 5 is a block/flow diagram showing a computing environment for monitoring and controlling shape-changing fan blades for cooling fan performance responsive to environmental conditions, in accordance with an embodiment of the present invention.

Referring to FIG. 5, a computing environment 700 contains an example of an environment for the execution of at least some of the computer code involved in performing the inventive methods 750, such as monitoring and controlling shape-changing fan blades for cooling fan performance. In addition to block 750, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 750, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 401, to keep the presentation as simple as possible. Computer 701 may be located in a cloud, even though it is not shown in a cloud in FIG. 5. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 750 in persistent storage 713.

COMMUNICATION FABRIC 711 is the signal conduction path that allows the various components of computer 701 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in block 750 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715. WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702. Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

Figure 6:
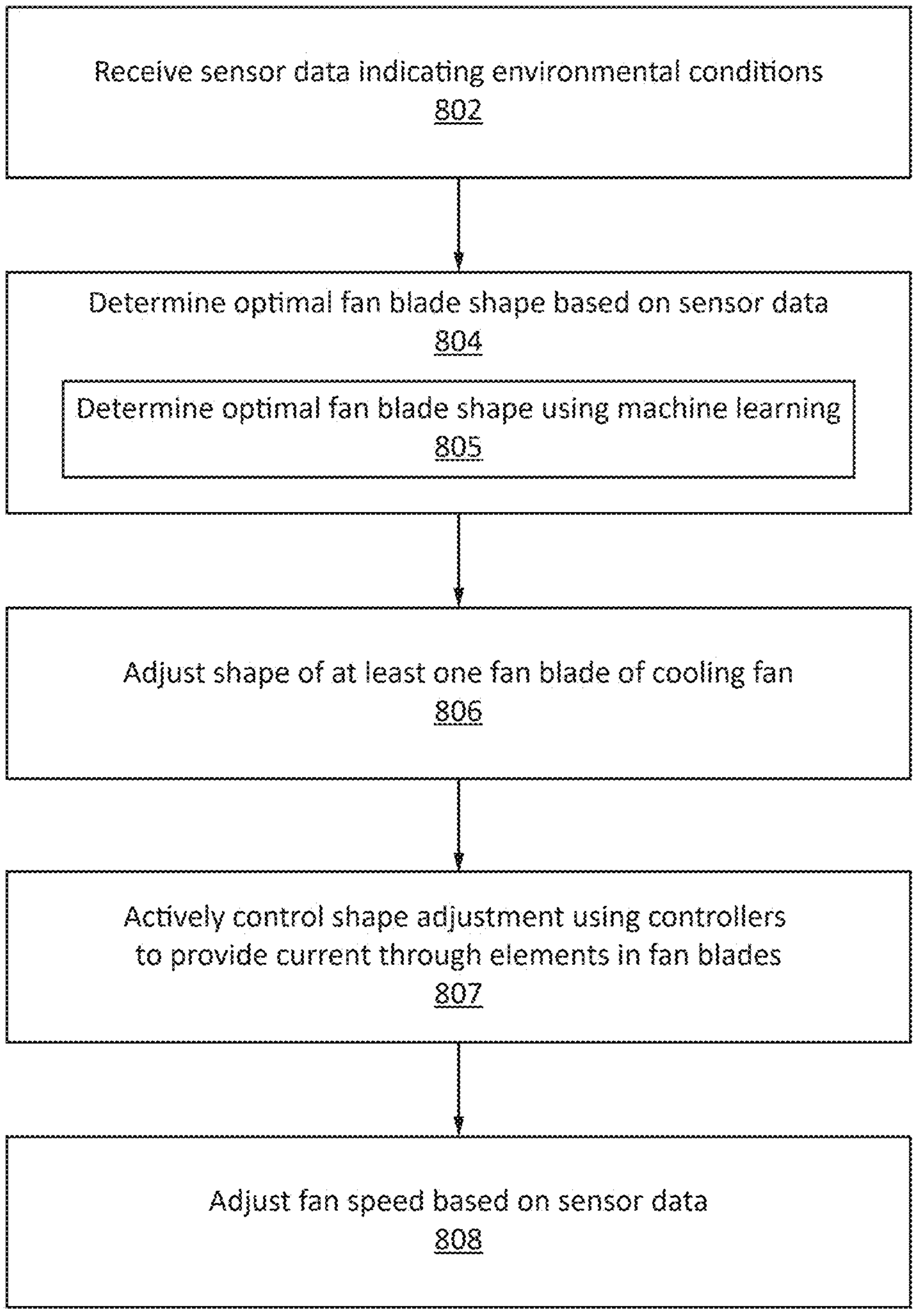
FIG. 6 is a flow diagram showing methods for actively adjusting a fan blade in accordance with embodiments of the present invention.

Referring to FIG. 6, a system/computer-implemented method for adjusting a fan blade in accordance with embodiments of the present invention is shown and described. In block 802, sensor data indicating environmental conditions is received by a controller and/or a computer system that can include a machine learning model. In block 804, an optimal fan blade shape is determined based on the sensor data. In block 805, the optimal fan blade shape can be determined using a machine learning model trained on correlations between one or more of environmental conditions, fan blade shapes, and/or at least one of power consumption or noise levels.

In block 806, a shape of at least one fan blade of a cooling fan is adjusted where the at least one fan blade includes a shape-changing material that changes shape in accordance with the environmental conditions. The environmental conditions can include one or more of temperature, humidity and/or vibration. The shape change can include one or more of a length, width and/or curvature of the at least one fan blade. The shape-changing material can be three-dimensional (3D)/four dimensional (4D) printed. In block 807, adjusting of the shape of the at least one fan blade can be actively controlled using controllers to provide current through elements formed in the fan blades. This can include providing conductive traces disposed within a polymeric material of the at least one fan blade through which controlled current is employed to adjust the shape of the blades.

In block 808, a fan speed can be adjusted based on the sensor data. In one example, the fan blade can be adjusted (length, curvature, etc.) so that fan speed can be reduced to reduce power consumption. The adjustment of the fan blade does not add mass to the fan blade. The mass is redistributed slightly and these effects can be adjusted for in the optimization performed using a machine learning model.

Figure 7:
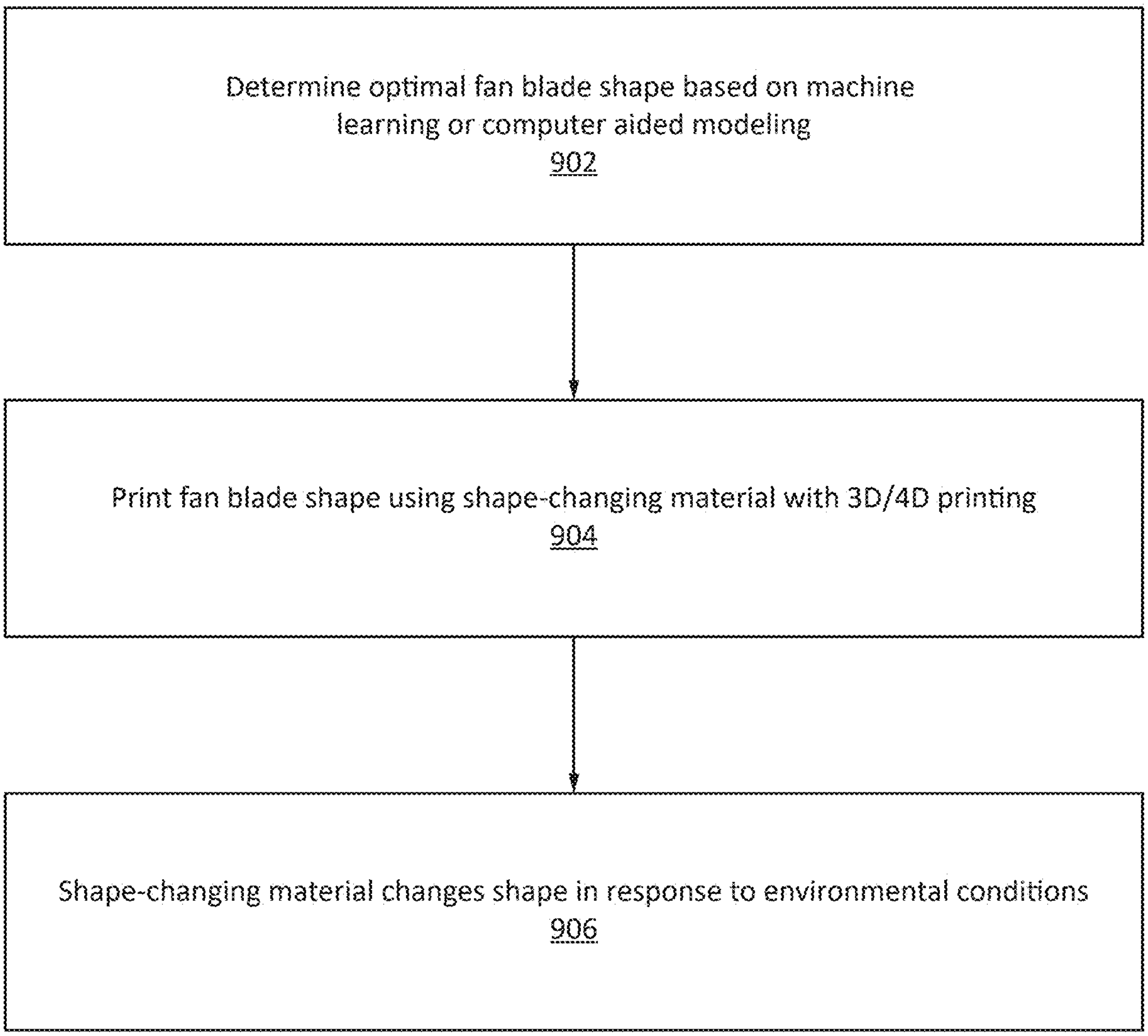
FIG. 7 is a flow diagram showing methods for passively adjusting a fan blade in accordance with embodiments of the present invention.

Referring to FIG. 7, a fan having an adjustable fan blade(s) in accordance with embodiments of the present invention is shown and described. In block 902, an optimal fan blade shape is determined based on machine learning or computer aided modeling. In block 904, a shape of at least one fan blade of a cooling fan is printed using shape-changing material with 3D/4D printing. In block 906, in response to environmental condition, the shape-changing material changes shape. The environmental conditions can include one or more of temperature, humidity and/or vibration. The shape change can include one or more of a length, width and/or curvature of the at least one fan blade. The shape of the at least one fan blade can be passively controlled using the selected materials, their orientation, positioning and patterning to adjust the shape of the blades to control e.g., power consumption or noise levels.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A system, comprising:

a fan comprising a plurality of fan blades, wherein at least one fan blade of the plurality of fan blades includes a shape-changing material, and the shape-changing material includes a liquid crystal elastomer;

a sensor configured to detect environmental conditions;

a processor set;

one or more computer-readable storage media; and program instructions stored on the one or more computer-readable storage media to cause the processor set to perform operations, including:

determining, using a machine learning model, correlations between the environmental conditions and optimal fan blade shapes; and adjusting a shape of the at least one fan blade based on the determining of the correlations.

2. The system of claim 1, further comprises a controller configured to adjust the shape of the at least one fan blade based on output from the machine learning model.

3. The system of claim 2, wherein the adjusting the shape includes changing at least one of a length, width, or curvature of the at least one fan blade.

4. The system of claim 2, wherein the controller is further configured to adjust a fan speed based on the output from the machine learning model.

5. The system of claim 4, wherein the operations further include determining, by the machine learning model, correlations between the environmental conditions, the optimal fan blade shapes, and at least one of power consumption or noise levels.

* * * * *